Jan. 13, 1953 C. O. PARISH ET AL 2,625,644
INSULATED INDUCTOR BLOCK FOR DESCALING METALS
Filed June 2, 1950 2 SHEETS—SHEET 1
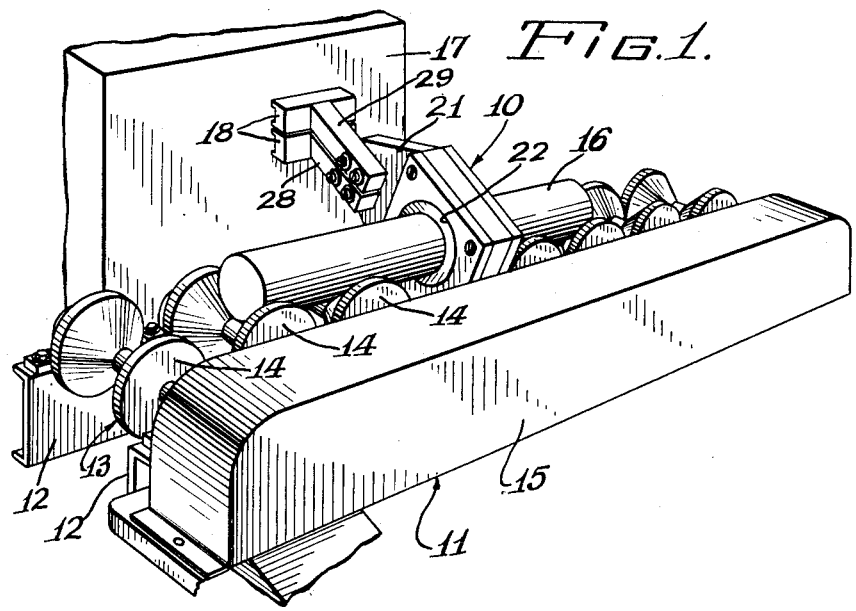
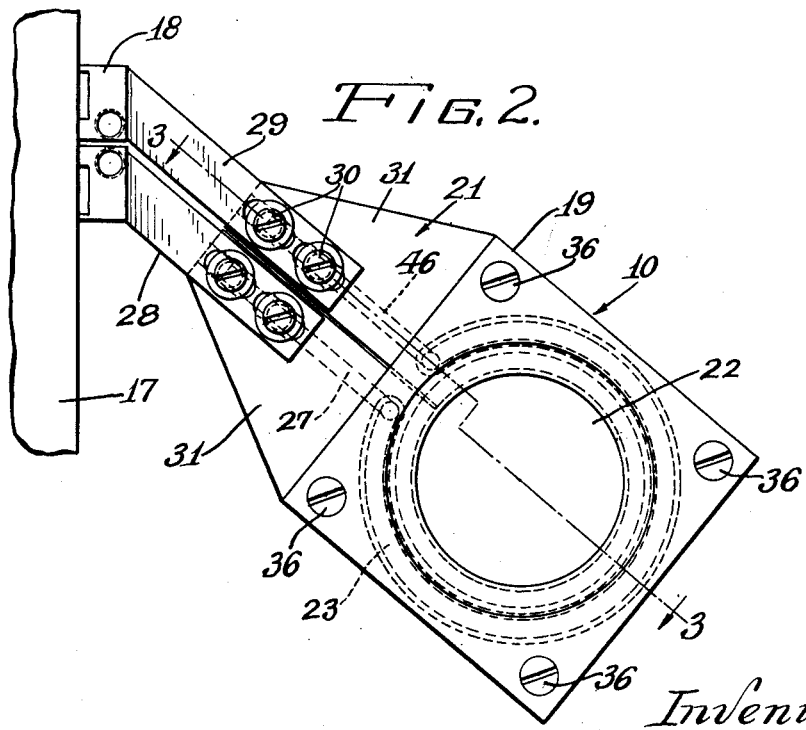
Inventors:
C. O. Parish
H. F. Kincaid
Paul O. Pippel
Atty.

Jan. 13, 1953     C. O. PARISH ET AL     2,625,644
INSULATED INDUCTOR BLOCK FOR DESCALING METALS
Filed June 2, 1950     2 SHEETS—SHEET 2
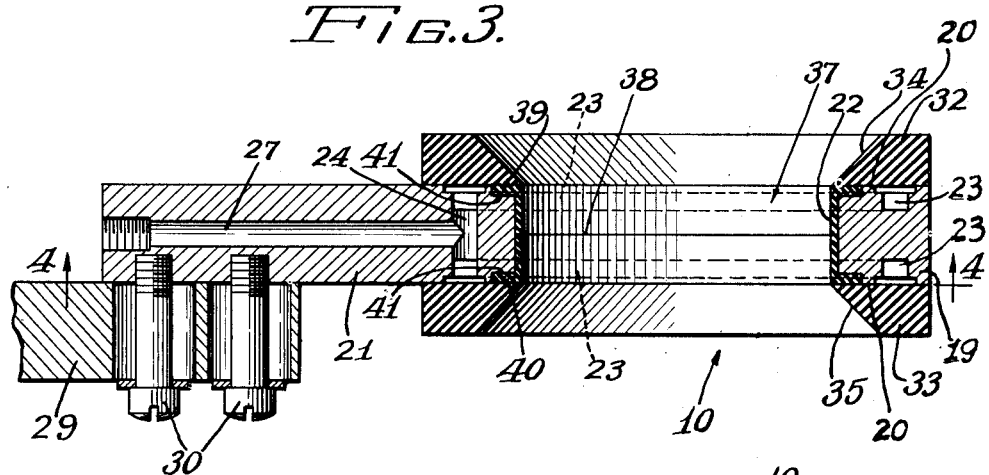
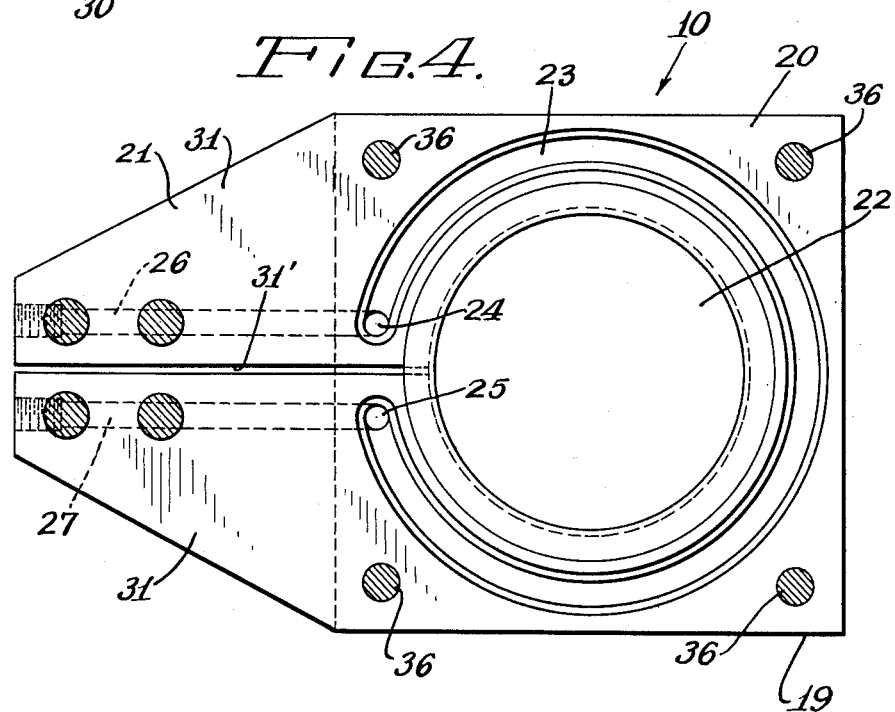
Inventors:
C. O. Parish
H. T. Kincaid
Paul O. Pippel
Atty.

Patented Jan. 13, 1953

2,625,644

UNITED STATES PATENT OFFICE 2,625,644

INSULATED INDUCTOR BLOCK FOR DESCALING METALS

Christian O. Parish, Rock Island, and Homer F. Kincaid, Carbon Cliff, Ill., assignors to International Harvester Company, a corporation of New Jersey Application June 2, 1950, Serial No. 165,618

1 Claim. (Cl. 219—47)

This invention relates to an improvement in inductor blocks normally used in the operation of induction heating. More specifically, this invention relates to an inductor block that is suitably constructed for performing descaling operation on metals.

The removal of surface scale from metal parts has always presented a serious manufacturing problem. The conventional methods of descaling which consist of sand blasting, shot blasting or tumbling, in most cases will ultimately result in a satisfactory job though the process is costly from an equipment and a maintenance standpoint. The use of induction heating has become more prominent in the metal industry in recent times and this process of heating has been developed for descaling metals. The theory of removing surface scale by the induction heating method is to raise the temperature of the surface scale rapidly whereby the scale expands causing a separation of the scale from the colder surface of the base material or article. The irregular electrical and heat conduction characteristics of the surface scale causes it to break up into small particles which lie freely on the surface of the article.

Conventional types of inductors have been utilized in the descaling operations and these have generally been found to be unsatisfactory. The inductors are connected to a source of high frequency current and a strong electro-magnetic field is produced around the inductor, this field induces current to flow around the part which causes a rapid temperature rise of the scale surface. In the operation of descaling, of course, large quantities of metal scale are removed from the surface of the article. This metal scale is quickly attracted by the magnetic field and causes adhesion of the scales to the sides of the inductor. This problem is generally so great that the inductor is completely covered with the scale particles within a matter of a few seconds. This, of course, will quickly cause a short circuit across the leads of the inductor and make the inductor useless in operation. It is applicants' prime object to provide an improved inductor constructed in a manner which will prevent the attraction of metal scale to the metal surface of an inductor block.

A still further object is to provide an inductor block having oppositely disposed sides suitably protected in a manner designed to prevent the adhesion of metal scale to the sides of the inductor.

A still further object is to provide an improved inductor having a bore for surrounding the article to be heated, the inductor having side plates and a bore covering made of a suitable non-magnetic material thereby completely protecting the inductor against the adhesion of metal particles incidental to a descaling operation.

A still further object is to provide a simplified inductor having cooling provisions exemplified in channels or grooves formed in the sides of the inductor, the grooves being suitably enclosed by removable insulating side plates designed to insulate the sides of the inductor against the adhesion of metal scale.

These and other objects will become more quickly apparent from a reading of the specification when examined in connection with the accompanying sheets of drawings.

In the drawings:

Fig. 1 is a perspective view showing a descaling machine embodying an improved inductor block.

Fig. 2 is a side elevational view of an improved inductor block and its supporting structure.

Fig. 3 is a sectional view through the inductor block taken substantially along the line 3—3 of Fig. 2.

Fig. 4 is a side elevational view of an inductor block, the view being generally taken along the line 4—4 of Fig. 3.

Referring particularly to Fig. 1 an inductor block generally designated by the reference character 10, is shown installed in operative relation in a descaling machine generally referred to by 11. The descaling machine 11 comprises, generally, a pair of parallel spaced channels 12 which support a roller conveyor 13. The roller conveyor 13 consists of a plurality of longitudinally spaced rolls 14 which may be suitably driven by means of suitable drive means (not shown) positioned within an enclosure 15. The inductor 10 is shown operating upon an elongated circular bar or rod 16, this bar 16 being carried on the rolls 14. The inductor 10 is supported on an upright wall 17 by means of brackets or supports 18.

Referring now particularly to Figs. 2, 3 and 4, the inductor 10 comprises a block 19 formed of a suitable highly conducting metal such as copper, etc. The block 19 includes transversely disposed side surfaces 20 and a tapered end portion 21. A bore 22 extends transversly through the block 19, this bore 22 opening outwardly of the side surfaces 20.

Each side surface 20 is provided with a recess or groove 23 annular in shape and substantially concentric with respect to the bore 22. As best shown in Figs. 3 and 4 the recess or grooves 23 are not continuous but terminate at points vertically spaced with respect to each other. The groove of one side of the block is connected with the groove of the other side of the block by means of transverse bores 24 and 25. The bore 24 is provided with an inlet conduit or bore 26 which extends through the tapered end portion 21. The bore 25 is likewise provided with an outlet bore or conduit 27 which extends through the tapered end portion 21. As best shown in Figs. 2 and 3 conductors 28 and 29 are connected by screws 30 to members 31 of the tapered portion 21, the members 31 being separated by a slot 31'.

The inductor block 19 is provided with oppositely or transversely spaced plates 32 and 33, the plates 32 and 33 being positioned over the surfaces 20 to completely cover these surfaces and protect them against the possible adhesion of metal scale. The plates 32 and 33 are respectively provided with tapered openings or bores 34 and 35 which are in registering alignment with the bore 22. The plates 32 and 33 are suitably connected to the side surfaces 20 of the inductor by means of pins or screws 36. The plates 32 and 33 consist of a material which is a good non-conductor of electricity and which thereby forms a barrier against the adhesion of scale which might result in a short circuiting of a high frequency induction block.

As best shown in Figs. 3 and 4 the surface of the bore 22 is completely covered or enclosed by means of a collar 37. The collar 37 is split as indicated at 38 to expedite assembly. The collar 37 is provided with radially outwardly extending flanges 39 and 40, these flanges being suitably secured in annular recesses 41 formed in the side surface 20 of the block 19. The flanges 39 and 40 are positioned in contiguous relation to the plates 32 and 33 and thus it can readily be seen that the bore 22 and the sides 20 of the inductor block are completely enclosed. The collar 37 is also formed of a good non-conductor material which will present a barrier to the adhesion of scale. The body of the collar 37 is made sufficiently narrow so that the electrical heating effectiveness of the inductor will not be hampered, through the collar will present an effective barrier against the adhesion of metal scale which results from the electromagnetic field due to the operation of the inductor.

During the operation the inductor block 19 is suitably connected to a source of cooling liquid whereupon the inlet conduit 26 permits liquid to enter into the recesses or channels 23, this liquid being exhausted through the outlet conduit 27. The plates 32 and 33 are tightly connected over the surfaces 20 and thus provide suitable closure means for the channels 23. Thus an inexpensive and effective cooling arrangement is provided for the inductor block.

The conductors 28 and 29 are connected to a suitable source of high frequency electrical current and the inductor block 19 is operable to receive, as indicated in Fig. 1, an elongated metal bar or rod 16. The collar 37 and the bores 34 and 35 of the plates 32 and 33 completely surround or encircle the bar 16. The operation of the inductor causes rapid surface heating of the outer surface of the bar 16 whereupon the surface scale is removed. This removal of the scale results from the rapid expansion of the surface of the metal with respect to its colder interior or base metal. Since the inductor is completely insulated or protected electrically by means of the plates 32 and 33, and the collar 37, any scale that might normally be attracted to the inductor is prevented from adhering to the metal sides of the block and to any surface of the block which is closely adjacent to the article treated.

It can now be seen that an improved inductor has been provided, the inductor permitting the practical application of induction heating to a descaling operation. By the application of the inductor block shown large quantities of metal may be descaled over a long period of time without any maintenance requirements. It must be understood that only a preferred embodiment of the invention has been shown and described and that changes may be made which do not depart from the spirit of the invention as disclosed nor from the scope thereof as defined in the appended claim.

What is claimed is:

A heating device for descaling elongated metal articles comprising a single coil inductor block having laterally spaced substantially parallel side surfaces, said block having a transversely positioned enlarged work receiving bore extending therethrough and providing openings in said side surfaces, the bore being adapted to surround an object to be heated, a groove in each side surface, each groove being substantially concentric with and laterally spaced with respect to the adjacent opening in said side surface, one end of each groove terminating in laterally spaced relation with respect to its other end, an inlet bore extending transversely through the block and connecting both grooves at one end of each groove, an outlet bore extending transversely through the block and connecting both grooves at the other end of each groove, inlet and outlet conduits in said block respectively connecting said inlet and outlet bores, a plate of non-conductor material secured to each parallel side surface, said plates providing covers for said grooves and said inlet and outlet bores, each of said plates having an opening therethrough registering with the work receiving bore, an annular collar of non-conducting material disposed within the bore for covering the wall of said bore, and outwardly projecting annular flanges on said collar, said flanges being contiguous to said non-conducting plates.

CHRISTIAN O. PARISH.
HOMER F. KINCAID.

REFERENCES CITED

The following references are of record in the file of this patent:

UNITED STATES PATENTS

| Number | Name | Date |
|---|---|---|
| 1,453,358 | Kettering | Mar. 1, 1923 |
| 1,842,461 | Sessions | Jan. 26, 1932 |
| 2,202,759 | Denneen et al. | May 28, 1940 |
| 2,227,866 | Somes | Jan. 7, 1941 |
| 2,277,223 | Goodridge | Mar. 24, 1942 |
| 2,411,409 | Ballard | Nov. 19, 1946 |
| 2,453,019 | King | Nov. 2, 1948 |
| 2,462,072 | Darmara | Feb. 22, 1949 |
| 2,481,008 | Gagliardi et al. | Sept. 6, 1949 |

FOREIGN PATENTS

| Number | Country | Date |
|---|---|---|
| 119,916 | Australia | May 1, 1945 |